(12) United States Patent
Sasaki et al.

(10) Patent No.: US 9,862,370 B2
(45) Date of Patent: Jan. 9, 2018

(54) CONTROL DEVICE FOR CONTROLLING ELECTRIC VEHICLE

(71) Applicant: MITSUBISHI JIDOSHA KOGYO KABUSHIKI KAISHA, Tokyo (JP)

(72) Inventors: Yusuke Sasaki, Tokyo (JP); Norihiko Ikoma, Tokyo (JP); Makoto Kamachi, Tokyo (JP); Yoshinori Tomita, Tokyo (JP); Ryo Shimizu, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/386,528

(22) Filed: Dec. 21, 2016

(65) Prior Publication Data

US 2017/0174202 A1 Jun. 22, 2017

(30) Foreign Application Priority Data

Dec. 22, 2015 (JP) ................................ 2015-250561

(51) Int. Cl.
| | | |
|---|---|---|
| *B60R 22/00* | (2006.01) | |
| *E05F 15/00* | (2015.01) | |
| *G05D 1/00* | (2006.01) | |
| *G05D 3/00* | (2006.01) | |
| *G06F 7/00* | (2006.01) | |
| *B60W 10/18* | (2012.01) | |

(52) U.S. Cl.
CPC ....... *B60W 10/18* (2013.01); *B60W 2710/182* (2013.01)

(58) Field of Classification Search
CPC ..................................................... B60W 10/18
See application file for complete search history.

(56) References Cited

U.S. PATENT DOCUMENTS

2010/0076637 A1* 3/2010 Ueoka ..................... B60T 7/042
 701/22
2013/0090799 A1* 4/2013 Nakamura .......... B60L 15/2063
 701/22

FOREIGN PATENT DOCUMENTS

JP 4127310 B2 7/2008

\* cited by examiner

*Primary Examiner* — Imran Mustafa
(74) *Attorney, Agent, or Firm* — Birch, Stewart, Kolasch & Birch, LLP

(57) ABSTRACT

A control device for controlling an electric vehicle includes a driving source that rotates wheels, a braking device that applies braking force to the wheels, a creep torque control portion that controls magnitude of creep torque to be applied to the wheels, wherein the creep torque control portion includes a braking force detecting unit that detects the braking force applied by the braking device, a fundamental creep torque calculating unit that calculates fundamental creep torque corresponding to vehicle speed, a creep suppression torque calculating unit that calculates creep suppression torque smaller than the fundamental creep torque based on a result of the detection of the braking force detecting unit and a creep torque calculating unit that calculate the creep torque by subtracting the creep suppression torque from the fundamental creep torque.

5 Claims, 4 Drawing Sheets

CONTROL DEVICE FOR CONTROLLING ELECTRIC VEHICLE

CROSS REFERENCE TO RELATED APPLICATION

This application is based on Japanese Patent Application No. 2015-250561 filed on Dec. 22, 2015, the contents of which are incorporated herein by reference.

BACKGROUND OF THE INVENTION

1. Technical Field

The present invention relates to a control device for controlling an electric vehicle which is provided with a driving source such as a traction motor (electric motor).

2. Related Art

For example, electric vehicles such as electric vehicles or hybrid vehicles heretofore have traction motors (electric motors) etc. provided as driving sources. According to a configuration of one of the traction motors provided in the electric vehicles, the traction motor generates plus-side driving force (torque) for making the electric vehicle travel by use of electric power from a battery, and on the other hand, the traction motor is operated as a power generator during deceleration etc. to generate minus-side regenerative force (torque). In addition, in some of the electric vehicles, a creep phenomenon caused by a torque converter of an engine vehicle is simulated in a predetermined low-speed region, and so-called creep torque is generated in the traction motor even when an accelerator pedal is OFF.

The creep torque is generated also during stopping of the vehicle. However, the creep torque is set at a magnitude enough to keep the electric vehicle at the stopping state when a brake pedal is depressed by a predetermined amount or more. Therefore, energy (electric power) for generating the creep torque during stopping of the vehicle is wastefully consumed. In order to suppress such a waste of energy, there has been proposed a technique for suppressing creep torque in accordance with a depression amount of a brake pedal.

In recent years, there has been developed an electric vehicle in which control (brake auto-hold control) for keeping braking force during stopping of the vehicle at a predetermined value is executed even in a state in which a brake pedal has not been depressed. There has been also proposed a technique for suppressing creep torque to zero when the control for keeping the braking force during stopping of the vehicle is in execution as described above (e.g. see Japanese Patent No. 4127310).

According to the technique described in Japanese Patent No. 4127310, it is possible to suppress wasteful consumption of energy (electric power).

However, as to the electric vehicle in which the creep torque is reduced to zero during stopping of the vehicle, as described in Japanese Patent No. 4127310, there is a fear that the electric vehicle may move backward when, for example, depression of the brake pedal is too shallow during stopping of the vehicle on an uphill road, to make it impossible to keep the electric vehicle at the stopping state.

Such a problem may occur even in a state in which the brake pedal has been depressed. Particularly, such a problem is apt to occur when the brake auto-hold control in which the brake pedal has not been depressed is in execution.

The invention has been accomplished in consideration of such circumstances. An object of the invention is to provide a control device for controlling an electric vehicle, which can suppress wasteful consumption of energy and keep the electric vehicle at a stopping state suitably.

SUMMARY OF THE INVENTION

In order to achieve the foregoing object, according to a first aspect of the invention, there is provided a control device for controlling an electric vehicle, including: a driving source that rotates wheels; and a braking device that applies braking force to the wheels; wherein: the control device further has a creep torque control portion that controls magnitude of creep torque to be applied to the wheels; and the creep torque control portion has: a braking force detecting unit that detects the braking force applied by the braking device; a fundamental creep torque calculating unit that calculates fundamental creep torque corresponding to vehicle speed; a creep suppression torque calculating unit that calculates creep suppression torque smaller than the fundamental creep torque, based on a result of the detection of the braking force detecting unit; and a creep torque calculating unit that subtracts the creep suppression torque from the fundamental creep torque to thereby obtain the creep torque.

According to a second aspect of the invention, there is provided a control device for controlling an electric vehicle according to the first aspect, wherein: the braking device has a master cylinder, and wheel cylinders that are provided in the wheels respectively so that the braking device can apply the braking force to the wheels by fluid pressure of the wheel cylinders; and the braking force detecting unit detects the fluid pressure of the wheel cylinders as the braking force.

According to a third aspect of the invention, there is provided a control device for controlling an electric vehicle according to the second aspect, further including: a brake control executing portion that executes brake auto-hold control for maintaining the fluid pressure of the wheel cylinders despite a depression amount of a brake pedal to thereby keep the vehicle at a stopping state; wherein: when the brake auto-hold control is in execution by the brake control executing portion, the creep suppression torque calculating unit calculates the creep suppression torque based on a maximum value of the braking force detected by the braking force detecting unit during stopping of the vehicle.

According to a fourth aspect of the invention, there is provided a control device for controlling an electric vehicle according to the second or third aspect, wherein: the braking force detecting unit estimates the fluid pressure of the wheel cylinders based on a depression amount of a brake pedal.

According to the control device for controlling the electric vehicle according to the invention, it is possible to control the creep torque suitably so that it is possible to suppress energy (electric power) consumed by a power source that is, for example, an electric motor, and it is possible to suppress the stopped electric vehicle from moving backward. Particularly, in the invention, when the brake pedal is depressed, the depression amount of the brake pedal is interlocked with the creep suppression torque so that the creep torque can be controlled desirably and suitably in accordance with an operation amount of the brake pedal operated by a user. Accordingly, the electric vehicle can be suitably suppressed from moving backward on an uphill road etc. Further, when the so-called brake auto-hold control is in execution, the creep torque is calculated based on the maximum value of the braking force of the braking device during stopping of the vehicle. Accordingly, it is possible to suitably suppress the stopped electric vehicle from moving backward, while suppressing consumption of the energy.

DESCRIPTION OF PREFERRED EMBODIMENT

An embodiment of the invention will be described below in detail with reference to the drawings.

Figure 1:
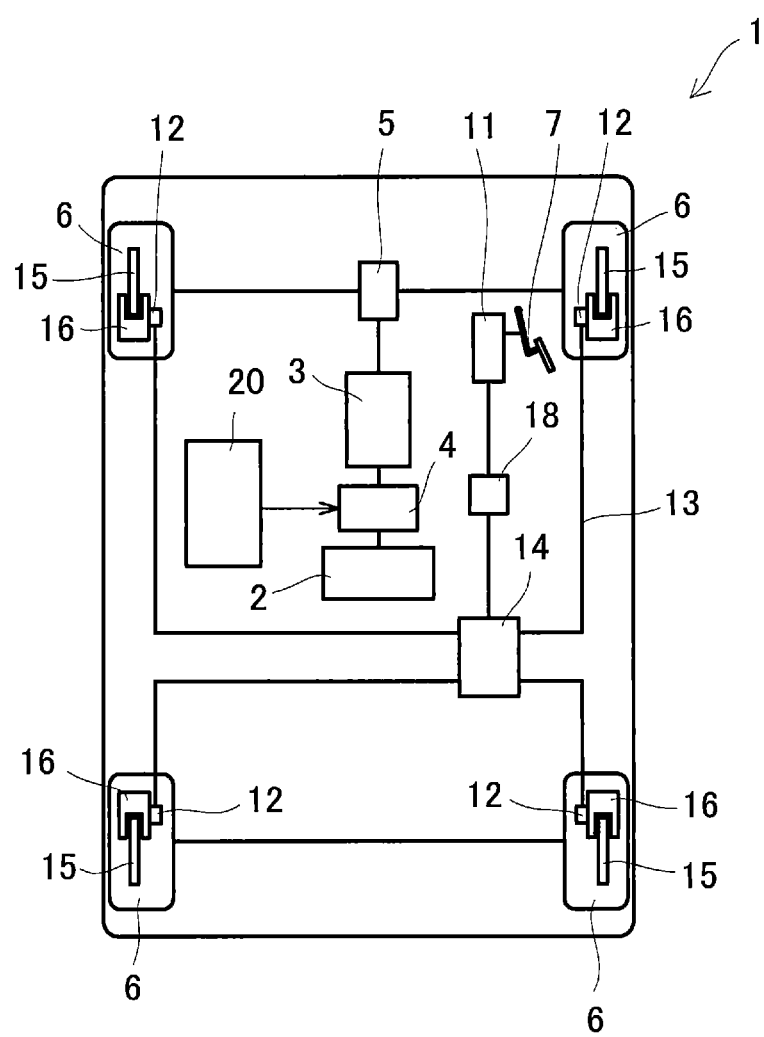
FIG. 1 is a view schematically showing the configuration of an electric vehicle according to an embodiment of the invention.

First, an overall configuration of an electric vehicle according to the embodiment will be described. As shown in FIG. 1, the electric vehicle 1 according to the embodiment is an electric vehicle (EV) provided with a battery 2 and a traction motor (electric motor) 3. The battery 2 is a rechargeable battery. The traction motor 3 serves as a driving source operated by electric power supplied from the battery 2. The battery 2 and the traction motor 3 are connected to each other through an inverter 4. For example, the traction motor 3 is coupled to wheels (front wheels which are driving wheels in the embodiment) 6 through a transmission system 5 including a not-shown automatic transmission etc.

In addition, the electric vehicle 1 is provided with a braking device for applying braking force to each wheel 6. The braking device is a so-called hydraulic braking device which is provided with a master cylinder (M/C) 11, wheel cylinders (W/C) 12, and a brake actuator 14. The master cylinder 11 is operated in response to depression of a brake pedal 7. The wheel cylinders 12 are provided in the wheels 6 respectively. The brake actuator 14 is disposed on a fluid pressure circuit 13 which supplies fluid pressure (e.g. oil pressure) from the master cylinder 11 to the respective wheel cylinders 12 so that the brake actuator 14 can adjust and output the fluid pressure. In addition, the braking device is provided with brake disks 15, and brake pads 16. The brake disks 15 are provided in the wheels 6 respectively. The brake pads 16 are driven by the wheel cylinders 12 to be brought into contact with the brake disks 15 respectively. When the brake pads 16 hold the brake disks 15 by the pressure of the wheel cylinders 12, predetermined braking force is applied to each of the wheels 6. Incidentally, since the brake actuator 14 has an existing configuration, detailed description thereof will be omitted here.

In addition, the electric vehicle 1 is provided with an ECU (Electronic Control Unit) 20 as a control device for comprehensively controlling the electric vehicle 1 including the braking device. The ECU 20 is provided with an input/output device, a storage device (an ROM, an RAM, etc.), a central processing unit (CPU), a timer counter, etc.

The ECU 20 controls operation of the traction motor 3 which is, for example, a driving source. Further, in the embodiment, as one of controls of the electric vehicle 1, the ECU 20 executes brake auto-hold control for maintaining the fluid pressure of the wheel cylinders 12 despite a depression amount of the brake pedal 7 to thereby keep the electric vehicle 1 at a stopping state. The ECU 20 suitably controls creep torque during stopping of the vehicle in a state in which the brake auto-hold control is in execution. The present invention is characterized in that such creep torque control for adjusting the magnitude of the creep torque is performed by the ECU 20. The creep torque control will be described below in detail.

Figure 2:
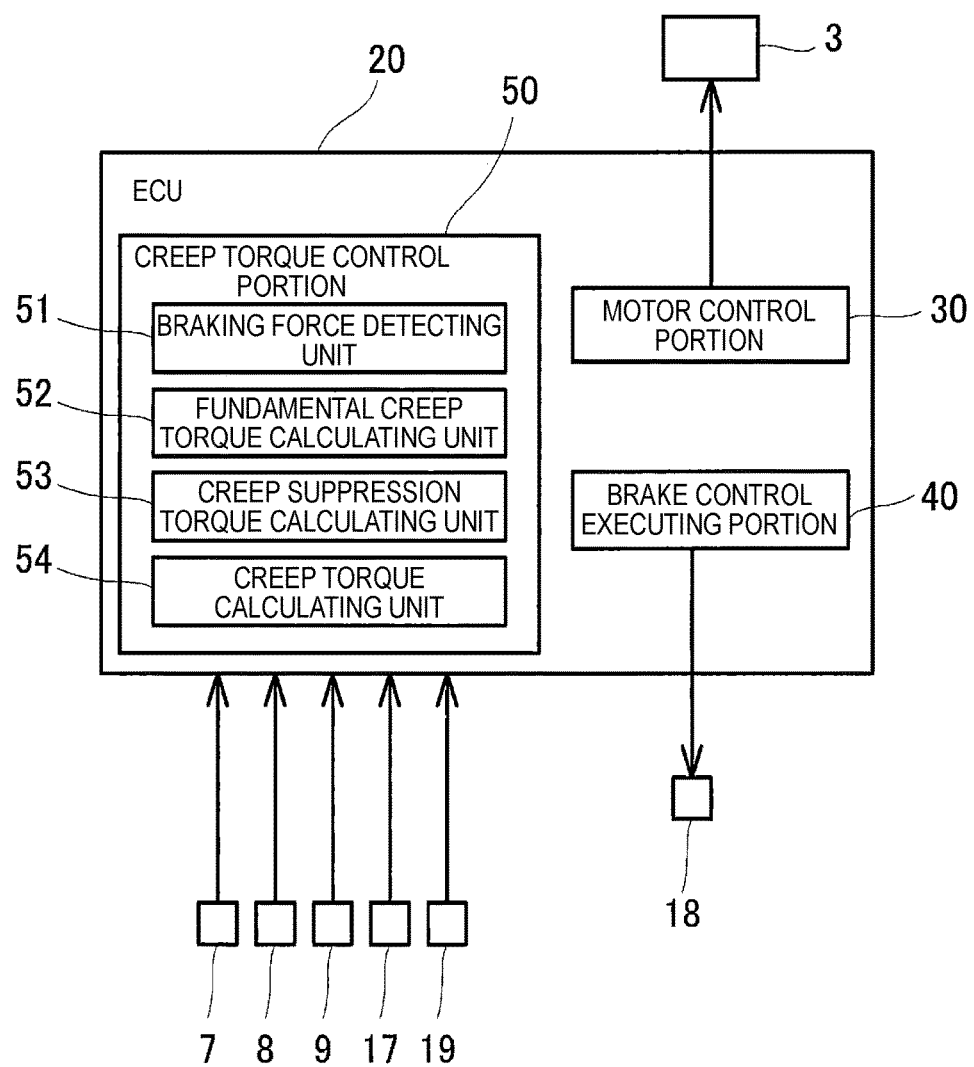
FIG. 2 is a block diagram schematically showing the configuration of a control device according to the embodiment of the invention.

As shown in FIG. 2, the ECU 20 has a motor control portion 30 which controls operation of the traction motor 3. In addition, the ECU 20 has a brake control executing portion 40 and a creep torque control portion 50. When a brake auto-hold switch 17 provided in the electric vehicle 1 is operated to be turned ON, the brake control executing portion 40 executes the brake auto-hold control for stopping the electric vehicle 1 (to activate the brake auto-hold control). When the brake auto-hold control is executed, the fluid pressure of the wheel cylinders 12 is maintained at the fluid pressure for stopping the vehicle or higher in a state in which the electric vehicle 1 has been stopped. That is, even when a driver releases his/her foot from the brake pedal 7 after stopping the vehicle, the fluid pressure of the wheel cylinders 12 is maintained at least at the fluid pressure for stopping the vehicle unless the electric vehicle 1 is restarted. The brake auto-hold control is continued during stopping of the vehicle. The brake auto-hold control is terminated (to be changed to a standby state) as soon as an accelerator pedal 8 is depressed by a predetermined amount or more to restart the electric vehicle 1.

Here, the method for adjusting the fluid pressure of the wheel cylinders 12 is not limited particularly. However, in the embodiment, an open/close state of an opening/closing valve 18 provided in the middle of the fluid pressure circuit 13 connecting the master cylinder 11 and each of the wheel cylinders 12 to each other is controlled to adjust the fluid pressure of the wheel cylinders 12. The opening/closing valve 18 is normally in the open state, and changed over to the close state by the brake control executing portion 40 if occasions demand. That is, the brake control executing portion 40 is designed to change over the opening/closing valve 18 from the open state to the close state when the electric vehicle 1 is stopped in an ON state of the brake auto-hold control. Thus, the fluid pressure of the wheel cylinders 12 is maintained. In addition, when the brake pedal 7 is depressed during stopping of the electric vehicle 1 by a larger amount than that for stopping the vehicle, the opening/closing valve 18 is changed to the open state. Then, in a state in which the fluid pressure of the wheel cylinders 12 has increased, the opening/closing valve 18 is changed over to the close state again. Thus, the fluid pressure of the wheel cylinders 12 can be maintained at a maximum value during stopping of the vehicle. Incidentally, the fluid pressure of the master cylinder 11 increases/decreases in connection with the depression amount of the brake pedal 7 even during stopping of the vehicle.

The creep torque control portion 50 controls the magnitude of creep torque to be applied to the wheels 6. In the embodiment, when the brake auto-hold control is not in execution, the creep torque control portion 50 detects the fluid pressure of the master cylinder 11, and controls the magnitude of creep torque in accordance with the result of the detected fluid pressure. On the other hand, when the brake auto-hold control is in execution, the creep torque control portion 50 detects (estimates) the fluid pressure of the wheel cylinders 12 and controls the magnitude of creep torque in accordance with the result of the detected fluid pressure. That is, when the brake auto-hold control is in execution by the brake control executing portion 40, the creep torque control portion 50 controls the magnitude of the creep torque based on a maximum value of braking force of the braking device (the maximum value of the fluid pressure of the wheel cylinders 12) during stopping of the electrically driven vehicle 1.

Specifically, the creep torque control portion 50 has a braking force detecting unit 51, a fundamental creep torque calculating unit 52, a creep suppression torque calculating unit 53, and a creep torque calculating unit 54.

The braking force detecting unit 51 detects braking force to be applied to the respective wheels 6 by the braking device. In the embodiment, the braking force detecting unit 51 detects the fluid pressure (oil pressure) of the master cylinder 11 as the aforementioned braking force when the brake auto-hold control is not in execution. The braking device is provided with a fluid pressure sensor 19 which measures the fluid pressure (oil pressure) of the master cylinder 11 corresponding to the depression amount of the brake pedal 7. The braking force detecting unit 51 acquires the measurement result of the fluid pressure sensor 19, as the aforementioned braking force.

In addition, the braking force detecting unit 51 detects the fluid pressure (oil pressure) of the wheel cylinders 12 as the braking force when the brake auto-hold control is in execution. In the embodiment, the braking force detecting unit 51 acquires the measurement result of the fluid pressure sensor 19 and estimates (detects), as the braking force, the fluid pressure of the wheel cylinders 12 of the respective wheels 6 from the measurement result.

Figure 3:
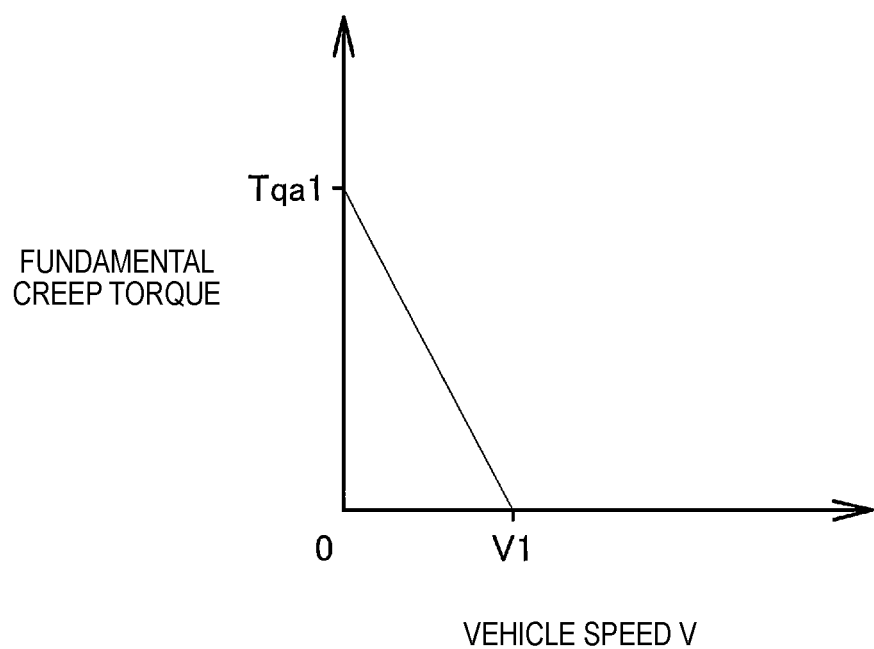
FIG. 3 is a graph showing an example of the relation between vehicle speed and fundamental creep torque.

The fundamental creep torque calculating unit 52 calculates fundamental creep torque Tqa, for example, corresponding to vehicle speed V detected by a vehicle speed sensor 9. The fundamental creep torque calculating unit 52 obtains the fundamental creep torque Tqa, for example, based on a map (see FIG. 3) defining the relation between the vehicle speed V which has been stored in advance and the fundamental creep torque Tqa. Incidentally, as shown in FIG. 3, the fundamental creep torque Tqa is defined to increase gradually as the vehicle speed V decreases from predetermined speed V1, and reach a maximum value Tqa1 at a point of time when the vehicle speed V is zero. The method for calculating the fundamental creep torque Tqa is not limited particularly but may be obtained, for example, from a numerical expression by arithmetic operation.

The creep suppression torque calculating unit 53 calculates creep suppression torque Tqb based on the detection result of the braking force detecting unit 51. Specifically, the creep suppression torque Tqb is calculated by the creep suppression torque calculating unit 53 so as to be a value which is proportional to the braking force detected by the braking force detection unit 51. The creep suppression torque calculating unit 53 calculates the creep suppression torque Tqb so that the larger the braking force detected by the braking force detecting unit 51 becomes, the larger the creep suppression torque Tqb gets, and the smaller the braking force detected by the braking force detecting unit 51 becomes, the smaller the creep suppression torque Tqb gets. In addition, the creep torque calculating unit 54 subtracts the creep suppression torque Tqb calculated by the creep suppression torque calculating unit 53 from the fundamental creep torque Tqa calculated by the fundamental creep torque calculating unit 52, to thereby calculate creep torque Tq (=Tqa−Tqb) having a proper magnitude to be actually applied to the respective wheels 6.

The motor control portion 30 suitably controls the inverter 4 so that the creep torque Tq calculated thus by the creep torque control portion 50 can be applied to the respective wheels 6 by the traction motor 3.

The creep torque control according to the embodiment by the control device 20 will be further described with reference to a timing chart of FIG. 4.

Figure 4:
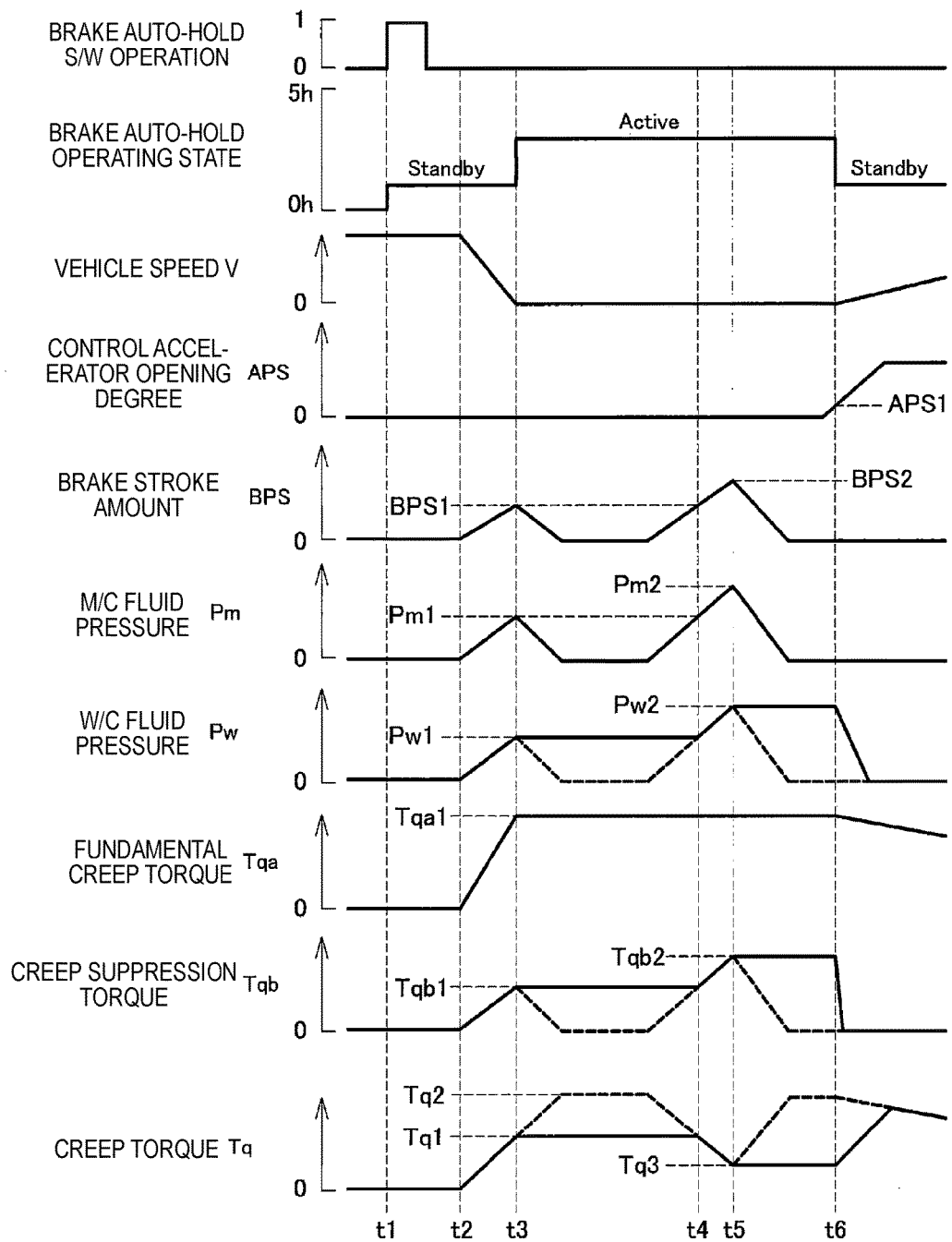
FIG. 4 is a timing chart explaining an example of creep torque control according to the invention.

As shown in FIG. 4, first, when the brake auto-hold switch 17 is operated to input a signal "1" at a time instant t1, brake auto-hold control is changed to an executable ON state (standby state). Incidentally, when the brake auto-hold switch 17 is operated again to input a signal "1" again in the ON state of the brake auto-hold control, the brake auto-hold control is suspended.

When the brake pedal 7 is depressed to begin to increase a brake stroke amount BPS at a time instant t2, fluid pressure Pm of the master cylinder 11 and fluid pressure Pw of the wheel cylinders 12 increase gradually accordingly. Thus, the brake disks 15 of the wheels 6 are held by the brake pads 16 so that vehicle speed V can decrease gradually to reach zero at a time instant t3.

During the period of time (between t2 and t3), fundamental creep torque Tqa increases gradually up to a maximum value Tqa1 as the vehicle speed V decreases. In addition, creep suppression torque Tqb increases up to a predetermined value Tqb1 as the fluid pressure Pm of the master cylinder 11 increases up to a predetermined value Pm1. Creep torque Tq obtained from the fundamental creep torque Tqa and the creep suppression torque Tqb also increases gradually up to a predetermined value Tq1.

When the brake stroke amount BPS reaches a predetermined value BPS1 and the vehicle speed V becomes zero at the time instant t3, the brake auto-hold control is executed (to be activated). When the vehicle speed V becomes zero and a driver stops depressing the brake pedal 7 to reduce the brake stroke amount BPS, the fluid pressure Pm of the master cylinder 11 decreases gradually from the predetermined value Pm1 accordingly. On the other hand, the fluid pressure Pw of the wheel cylinders 12 is maintained at a predetermined value Pw1 for stopping the vehicle (at the time instant t3) because the brake auto-hold control is in execution. When the brake auto-hold control is changed to the active state, the opening/closing valve 18 is changed over to a close state as described above. Accordingly, the fluid pressure Pw of the wheel cylinders does not decrease but is maintained at the predetermined value Pw1 for stopping the vehicle.

When the brake auto-hold control is in execution, the creep suppression torque calculating unit 53 calculates the creep suppression torque Tqb in accordance with not the fluid pressure Pm of the master cylinder 11 but the fluid pressure Pw of the wheel cylinders 12 estimated from the fluid pressure Pm of the master cylinder 11. Therefore, during stopping of the vehicle, the creep suppression torque Tqb is maintained at the predetermined value Tqb1 for stopping the vehicle (at the time instant t3). As a result, the creep torque Tq is also maintained at the predetermined value Tq1 for stopping the vehicle.

Incidentally, when the brake auto-hold control is in an OFF state, the fluid pressure Pw of the wheel cylinders 12 decreases, as indicated by a dotted line in FIG. 4, similarly to the fluid pressure Pm of the master cylinder 11 after the stopping of the vehicle. In addition, the creep torque Tq also increases up to a predetermined value Tq2 accordingly.

Assume that the brake pedal 7 is then depressed again at a time instant t4 in a state in which the electric vehicle 1 is stopped, so that the brake stroke amount BPS can exceed the predetermined value BPS1 for stopping the vehicle (at the time instant t3) and increase up to a predetermined value PBS2 (at a time instant t5). In this case, the fluid pressure Pm of the master cylinder 11 also increases up to a predetermined value Pm2 accordingly. On this occasion, the opening/closing valve 18 is once changed over to an open state so that the fluid pressure Pw of the wheel cylinders 12 can also exceed the predetermined value Pw1 for stopping the vehicle and increase up to a predetermined value Pw2.

In this case, the fluid pressure Pw of the wheel cylinders 12 is updated and maintained at the predetermined value Pw2 which is the maximum value. The creep suppression torque Tqb also increases up to a predetermined value Tqb2 in accordance with the updating of the fluid pressure Pw of the wheel cylinders 12. As a result, the creep torque Tq decreases down to a predetermined value Tq3 and is then maintained at the value Tq3.

When the accelerator pedal 8 is then depressed and an accelerator opening degree APS reaches a predetermined opening degree APS1 at a time instant t6, execution of the brake auto-hold control is terminated (to be changed to a standby state), and the opening/closing valve 18 is changed over to the open state at this point of time. That is, maintenance of the fluid pressure Pw of the wheel cylinders 12 is terminated, so that the fluid pressure Pw of the wheel cylinders 12 decreases gradually. At the time instant t6, the fluid pressure Pm of the master cylinder 11 is zero. Accordingly, the fluid pressure Pw of the wheel cylinders 12 also decreases down to zero. In addition, in accordance with termination of the execution of the brake auto-hold control, the method for calculating the creep suppression torque Tqb changes over from calculation based on the fluid pressure Pw of the wheel cylinders 12 to calculation based on the fluid pressure Pm of the master cylinder 11. At the time instant t6, the fluid pressure Pm of the master cylinder 11 is zero. Accordingly, the creep suppression torque also decreases suddenly until it becomes zero. In accordance with the change of the creep suppression torque Tqb, the creep torque Tq also increases.

Incidentally, when the creep torque is calculated in accordance with the sudden change of the creep suppression torque Tqb caused by the termination of the brake auto-hold control, the creep torque also increases suddenly. Therefore, a limit is placed on a climb gradient of the creep torque.

According to the aforementioned control device 20 for controlling the electric vehicle 1 according to the embodiment, it is possible to control the creep torque during stopping of the vehicle suitably. Accordingly, it is possible to suppress electric power consumed by the traction motor 3, and it is also possible to suppress the stopped electric vehicle 1 from moving backward. Particularly, the creep torque is controlled suitably so as not to become zero according to the invention. Accordingly, it is possible to suitably suppress the electric vehicle from moving backward on an uphill road etc.

In addition, according to the embodiment, configuration is made so that the creep torque is calculated based on the maximum value of the braking force of the braking device during stopping of the vehicle when the so-called brake auto-hold control is in execution. That is, as the force for holding the brake disks 15 by the brake pads 16 is stronger, the creep torque is suppressed to be smaller. Accordingly, electric power consumed by the traction motor 3 can be more surely suppressed and the electric vehicle 1 which is stopped can be also more suitably suppressed from moving backward.

Although one embodiment of the invention has been described above, the invention is not limited to the aforementioned embodiment.

For example, according to the aforementioned embodiment, configuration is made so that the fluid pressure of the wheel cylinders is estimated from the fluid pressure of the master cylinder. However, the method for detecting (estimating) the fluid pressure of the wheel cylinders is not limited particularly. For example, the fluid pressure of each wheel cylinder may not have to be estimated but may be detected by a sensor etc.

In addition, according to the aforementioned embodiment, configuration is made so that the creep torque control for adjusting the magnitude of the creep torque is executed based on the braking force of the braking device when the brake auto-hold control is in execution. However, it is a matter of course that similar creep torque control may be executed also in the case where the brake auto-hold control is not in execution.

Further, in the aforementioned embodiment, the braking device is configured to include the master cylinder and the wheel cylinders by way of example. However, the configuration of the braking device is not limited particularly. The braking device may have any configuration as long as the creep torque control can be executed based on the braking force of the braking device.

In addition, an electric vehicle (EV) provided with a traction motor is shown as an example of the electric vehicle in the aforementioned embodiment for description of the invention. However, it is a matter of course that the invention can be applied to various electric vehicles. For example, the invention may be also applied to a hybrid vehicle etc. including an engine (internal combustion engine) as a driving device together with a traction motor.

What is claimed is:

1. A control device for controlling an electric vehicle comprising:
   a driving source that rotates wheels;
   a braking device that applies braking force to the wheels, the braking device including a master cylinder, and wheel cylinders which are provided in the wheels respectively, the braking force being applied to the wheels by fluid pressure of the wheel cylinders;
   a fluid pressure sensor that detects a fluid pressure in the master cylinder;
   a brake control executing portion that executes a brake auto-hold control for maintaining the fluid pressure of the wheel cylinders and keeping the vehicle at a stopping state despite a depression amount of a brake pedal,
   a creep torque control portion that controls magnitude of creep torque to be applied to the wheels,
   wherein the creep torque control portion includes:
      a braking force detecting unit that detects the braking force applied by the braking device;
      a fundamental creep torque calculating unit that calculates fundamental creep torque corresponding to vehicle speed;
      a creep suppression torque calculating unit that calculates creep suppression torque smaller than the fundamental creep torque based on a result of the detection of the braking force detecting unit; and
      a creep torque calculating unit that calculate the creep torque by subtracting the creep suppression torque from the fundamental creep torque,
   wherein
      when the brake auto-hold control is in execution by the brake control executing portion, the braking force detecting unit detects the braking force by estimating a fluid pressure in the wheel cylinders based on an output from the fluid pressure sensor, and the creep suppression torque calculating unit calculates the creep suppression torque based on the estimated fluid pressure of the wheel cylinders, and when the brake auto-hold control is in a standby state, the braking force detecting unit acquires the braking force based on the output from the fluid pressure sensor, and the creep suppression torque calculating unit calculates the creep suppression torque based on the acquired fluid pressure of the master cylinder.

2. The control device according to claim 1, wherein the braking force detecting unit estimates the fluid pressure of the wheel cylinders as the braking force.

3. The control device according to claim 2 wherein when the brake auto-hold control is in execution by the brake control executing portion, the creep suppression torque calculating unit calculates the creep suppression torque based on a maximum value of the estimated fluid pressure in the wheel cylinders.

4. The control device according to claim 2, wherein the braking force detecting unit estimates the fluid pressure of the wheel cylinders based on a depression amount of a brake pedal.

5. The control device according to claim 3, wherein the braking force detecting unit estimates the fluid pressure of the wheel cylinders based on the depression amount of the brake pedal.

* * * * *